United States Patent
Koskinen (10) Patent No.: US 10,412,782 B2
(45) Date of Patent: Sep. 10, 2019

(54) GROUP COMMUNICATION

(71) Applicant: Nokia Solutions and Networks Oy, Espoo (FI)

(72) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 81 days.

(21) Appl. No.: 15/022,999

(22) PCT Filed: Sep. 30, 2013

(86) PCT No.: PCT/EP2013/070335
§ 371 (c)(1),
(2) Date: Mar. 18, 2016

(87) PCT Pub. No.: WO2015/043672
PCT Pub. Date: Apr. 2, 2015

(65) Prior Publication Data
US 2016/0212771 A1    Jul. 21, 2016

(51) Int. Cl.
*H04W 76/40* (2018.01)
*H04W 72/00* (2009.01)

(52) U.S. Cl.
CPC ......... *H04W 76/40* (2018.02); *H04W 72/005* (2013.01)

(58) Field of Classification Search
CPC .. H04W 76/002; H04W 72/005; H04W 76/40
See application file for complete search history.

(56) References Cited

U.S. PATENT DOCUMENTS

| 2012/0099504 | A1 | 4/2012 | Hyun et al. |
| 2012/0172028 | A1* | 7/2012 | Korus ............... H04W 60/00 455/422.1 |
| 2013/0064160 | A1 | 3/2013 | Newberg et al. ............ 370/312 |
| 2014/0355508 | A1* | 12/2014 | Anchan ............... H04W 4/10 370/312 |

(Continued)

FOREIGN PATENT DOCUMENTS

| CN | 101043431 A | 9/2007 |
| WO | WO 2012/167841 A1 | 12/2012 |

OTHER PUBLICATIONS

3GPP TSG RAN WG2 #83bis, Oct. 7-11, 2013, Ljubljana, Slovenia, R2-133535, "Group Communication over eMBMS", Qualcomm Inc., 4 pgs.

(Continued)

*Primary Examiner* — Pao Sinkantarakorn
*Assistant Examiner* — Kabir U Jahangir
(74) *Attorney, Agent, or Firm* — Harrington & Smith (57) ABSTRACT

A method is disclosed for group communication in a communications system, the method including monitoring, in a user terminal, for broadcasted service data on a generic broadcast bearer associated with communication services. In response to receiving an indication of broadcasted service data appearing on the generic broadcast bearer, the user terminal may receive broadcasted service data on the generic broadcast bearer. In response to a separate service-specific broadcast bearer being established for a specific communication service, the user terminal may receive broadcasted service data related to the specific communication service on the service-specific broadcast bearer.

12 Claims, 4 Drawing Sheets

(56) References Cited

U.S. PATENT DOCUMENTS

2015/0079979 A1* 3/2015 Anchan ............... H04L 12/189
                                                                455/433

OTHER PUBLICATIONS

3GPP TSG SA Meeting #59, Vienna, Austria, Mar. 4-6, 2013, SP-130158, Updated WID proposal for Group communication System Enablers for LTE (GCSE LTE), TSG SA WG2, 6 pgs.

SA WG2 Meeting #96, San Diego, USA, Apr. 8-12, 2013, S2-131509, "Architecture & functional requirements for GCSE-LTE", Qualcomm Inc., 5 pgs.

SA WG2 Meeting S2#98, Jul. 15-19, 2013, Valencia, Spain, S2-132563, "refinement of solutions in section 6.5", Alcatel Lucent, EADS, 6 pgs.

SA WG2 Meeting #99, Xiamen, China, Sep. 23-27, 2013, S2-133826, "Clarifications on pre-established eMBMS bearers for GCSE", Qualcomm Inc., 5 pgs.

3GPP TR 23.768 V0.1.0 (Apr. 2013), "$3^{rd}$ Generation Partnership Project; Technical Specification Group Services and System Aspects; Study on architecture enhancements to support Group Communication System Enablers for LTE (GCSE LTE) (Release 12)", 11 pgs.

3GPP TS 22.468 V1.0.1 (Jun. 2013), "$3^{rd}$ Generation Partnership Project; Technical specification Group Services and System Aspects; Group Communication System Enablers for LTE (GCSE LTE); Release 12", 22 pgs.

* cited by examiner

GROUP COMMUNICATION

FIELD OF THE INVENTION

The exemplary and non-limiting embodiments of this invention relate generally to wireless communications networks, and more particularly to group communication.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

A group call may involve a large number of participants per cell at an incident location. The number of receiver group members in any area may be unlimited. A system may be optimised to minimise time intervals related to the use of group communication. To meet requirements for group communication, pre-established MBMS bearers may be used. Pre-established MBMS bearers, if adapted to an unmodified 3GPP framework, come with some scalability issues.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, an apparatus and a computer program product as defined in the independent claims. Further embodiments of the invention are disclosed in the dependent claims.

An aspect of the invention relates to a method for group communication in a communications system, the method comprising monitoring, in a user terminal, for broadcasted service data on a generic broadcast bearer associated with communication services; in response to receiving an indication of broadcasted service data appearing on the generic broadcast bearer, receiving, in the user terminal broadcasted service data, on the generic broadcast bearer.

A further aspect of the invention relates to a group communication in a communications system, the method comprising broadcasting, from the network apparatus to user terminals, service data related to the specific communication service, on a generic broadcast bearer.

A still further aspect of the invention relates to an apparatus comprising at least one processor; and at least one memory including a computer program code, wherein the at least one memory and the computer program code are configured to, with the at least one processor, cause the apparatus to perform any of the method steps.

A still further aspect of the invention relates to a computer program product comprising program instructions which, when run on a computing apparatus, causes the computing apparatus to perform any of the method steps.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

An exemplary embodiment enables improving the usability of LTE/LTE-A for mission-critical group communication for public-safety officials such as police. A typical service envisioned in this context is a voice group call with possibly a large number of participants per cell at an incident location.

Regarding system performance, a system may be optimised to minimise time intervals related to the use of group communication. The system may provide a mechanism to support a group communication end-to-end setup time less than or equal to 300 ms (a recommended time interval). It may be assumed that this value is for an uncontended network where there is no presence checking and no acknowledgements requested from receiver group member(s). The end-to-end setup time may be defined as the time between the point when a group member initiates a group communication request on UE and the point when this group member is able to start sending voice or data communication. The time from when a UE requests to join an on-going group communication to the time when UE receives the group communication is less than or equal to 300 ms (a recommended time interval). The 300 ms intervals indicated above are based on requirements for legacy TETRA mission critical voice systems. These requirements are important e.g. for half duplex voice communication and other data that is delay sensitive. These requirements are not necessarily met in some cases where the data is delay insensitive, e.g. a large document and/or where the type of group communication requires acknowledgement(s) from the receiver group members before the communication is allowed to proceed. The end to end delay for media transport for the group communication may be less than or equal to 150 ms.

Regarding system scalability, the number of receiver group members in any area may be unlimited.

To meet the requirements, pre-established MBMS bearers may be used, i.e. an MBMS bearer for a delay-critical service is kept active even when the service itself is not active.

Pre-established MBMS bearers, if adapted to an unmodified 3GPP framework, come with some scalability issues. There may be a large number of groups each requiring their own service operating even in a limited region. It is often not possible to accurately predict beforehand the exact set of cells where a given group-service session needs to be started. As a result, a pre-established MBMS bearer needs to operate in an MBSFN area consisting of a conservative (i.e. greater than eventually needed) set of cells. An MCCH channel periodically broadcasts service identity, or TMGI, as well as the radio-level identity LCID used, of each MBMS service for which an MBMS bearer is active in that MBSFN area, in an PMCH-InfoList information element. Each TMGI requires at least 27 bits to signal. This may lead to a signalling-bit explosion, due to having to keep broadcasting TMGIs for each of the high number of pre-established MBMS bearers in a given cell.

An exemplary embodiment relates to group communication in LTE. An exemplary embodiment discloses a non-service-specific pre-established broadcast bearer allowing a fast start for several services. Regarding the scalability, an exemplary embodiment uses a generic pre-established broadcast bearer, not dedicated to any specific service, for the purpose of fast service initiation. Terminals interested in different services and waiting for a possible service session to start each monitor the same, generic bearer in case data starts to be scheduled and broadcast, according to how the identity/identities (such as TMGI, LCID) of the generic bearer has/have been associated with the various services as a part of higher-layer pre-configuration information. Once a session for a given service starts, its data is broadcast for some time on the generic bearer (and hence received by each terminal monitoring this bearer). The precise identity of the service in question is signalled in-band as a part of the scheduled data. It may be assumed that the terminals not authorized to receive the service content do not have keys to decipher the content. Eventually, for the service with session starting a separate broadcast bearer of its own is established, identified with its own identifiers, at which point the broadcasting of the data moves from the generic bearer to the service-specific bearer. The receiving terminals may notice this from the appearance of the service in question on an MCCH channel. A purpose of eventually stopping the broadcasting on the generic bearer is to stop draining the batteries of terminals not addressed by the service in question.

Thus, only one such generic pre-established bearer may be needed per MCH channel (characterized by the same set of cells, same set of reserved sub-frames, and same modulation and coding used in transmission).

The generic bearer for the initial broadcasting of the group communication may also be applied in the case where the broadcasting is done using a cell-specific broadcasting mode. In that case, the terminals may monitor a general-purpose broadcast RNTI for the transmissions, instead of MCH.

An exemplary embodiment enables improving the signalling-scalability of the system (minor increase in terminal power consumption may occur; a given terminal momentarily needs to receive the data for the service with session starting, although not necessarily addressed to that terminal).

In an exemplary embodiment, MBMS protocols and codecs for each group service are pre-configured, as well as the IDs of the associated generic pre-established broadcast bearer(s) that the terminal needs in order to monitor the potentially starting data broadcast.

In an exemplary embodiment, to enhance the scalability, a generic pre-established broadcast bearer is used, not dedicated to any specific service, for the fast service initiation. The terminals interested in different services and waiting for a possible service session to start each monitor the same, generic bearer in case the data starts to be scheduled and broadcast. Thus, only a single generic pre-established bearer is needed per MCH channel (characterized by the same set of cells, the same set of reserved sub-frames, and the same modulation and coding used in the transmission).

An exemplary embodiment relates to LTE/LTE-A and to supporting group communication. To support group communication, MBMS and pre-established MBMS bearers are used, which, however, require a lot of signaling, thus reducing the efficiency of the system. An exemplary embodiment addresses the scalability issues by using the generic pre-established broadcast bearer for the fast service initiation. In an exemplary embodiment, only a single bearer is needed for each MBMS channel.

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on LTE advanced, LTE-A, that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. For example, the embodiments are applicable to both frequency division duplex (FDD) and time division duplex (TDD).

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease inter-symbol interference. Unlike in OFDM, SC-FDMA subcarriers are not independently modulated.

Figure 1:
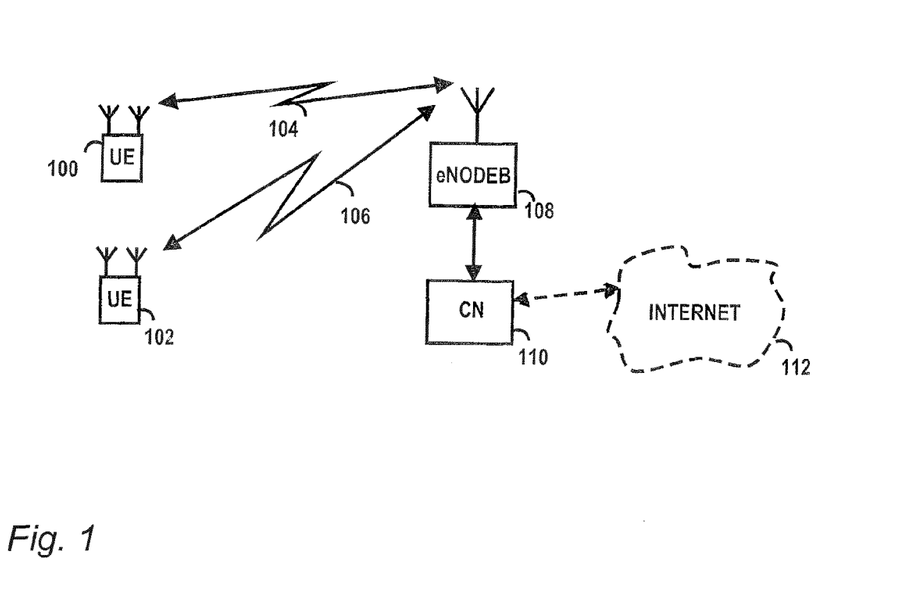
FIG. 1 shows a simplified block diagram illustrating exemplary system architecture.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), bluetooth, personal communications services (PCS), ZigBee, wideband code division multiple access (WCDMA), systems using ultra-wideband (UWB) technology, sensor networks, mobile ad-hoc networks (MANETs) and internet protocol multimedia subsystems (IMS).

FIG. 1 shows a part of a radio access network of E-UTRA, LTE, LTE-advanced (LTE-A) or LTE/EPC (EPC=evolved packet core, EPC is enhancement of packet switched technology to cope with faster data rates and growth of internet protocol traffic). E-UTRA is an air interface of release-8 (UTRA=UMTS terrestrial radio access, UMTS=universal mobile telecommunications system). Some advantages obtainable by LTE (or E-UTRA) are a possibility to use plug and play devices, and frequency division duplex (FDD) and time division duplex (TDD) in the same platform.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or evolved node-B (eNodeB, eNB) in LTE and in LTE-advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to a core network 110 (CN). Depending on the system, the counterpart on the CN side may be a serving gateway (S-GW, routing and forwarding user data packets), a packet data network gateway (P-GW), for providing connectivity of user devices (UEs) to external packet data networks, or a mobility management entity (MME), etc.

A communications system typically comprises more than one (e)NodeBs in which case the (e)NodeBs may also be configured to communicate with one another over links, wired or wireless, designed for the purpose. These links may be used for signalling purposes.

The communication system is also able to communicate with other networks, such as a public switched telephone network or the internet 112.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer-3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device.

The user device (or in some embodiments a layer-3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, the user devices are depicted to include two antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a home (e)NodeB. Additionally, in a geographical area of a radio communication system a plurality of different kinds of radio cells as well as a plurality of radio cells may be provided. The radio cells may be macro cells (or umbrella cells) which are large cells, usually having a diameter of up to tens of kilometres, or smaller cells such as micro-, femto- or picocells. The (e)NodeB 108 of FIG. 1 may provide any kind of these cells. A cellular radio system may be implemented as a multilayer network including several kinds of cells. In multilayer networks, typically, one (e)NodeB provides one kind of a cell or cells, and thus a plurality of (e)NodeBs are required to provide such a network structure.

Figure 2:
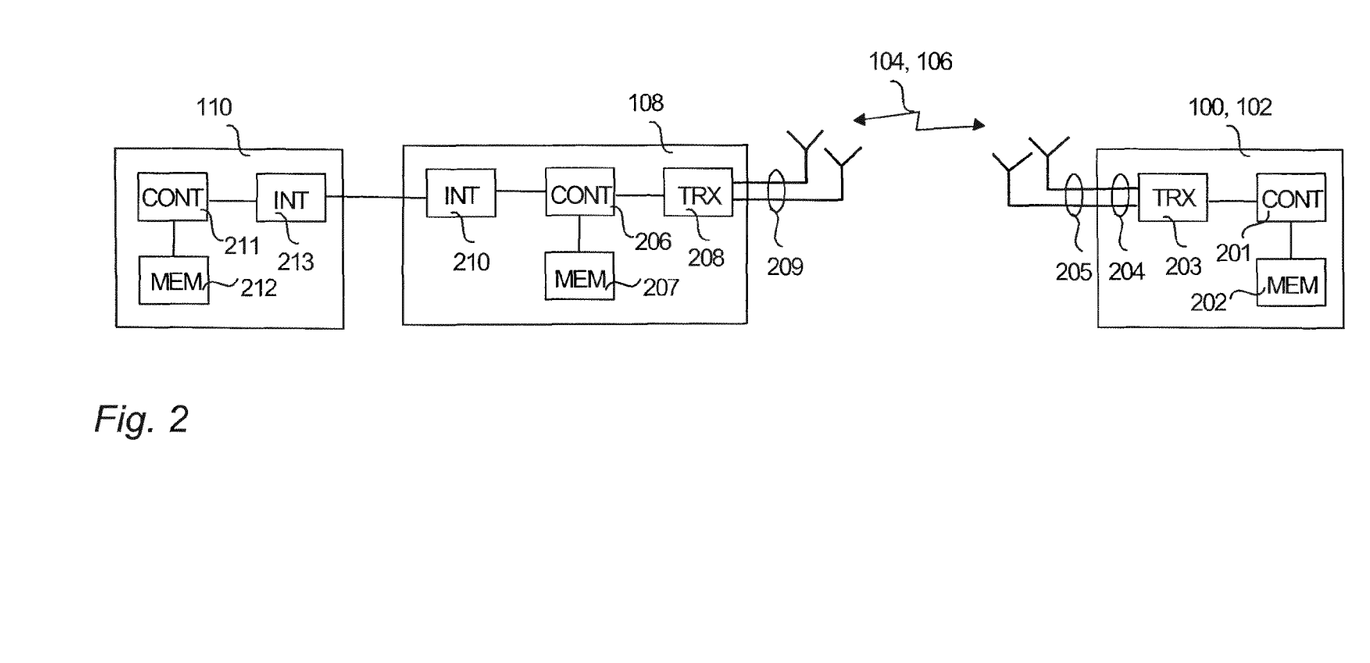
FIG. 2 shows a simplified block diagram illustrating exemplary apparatuses.
Figure 3:
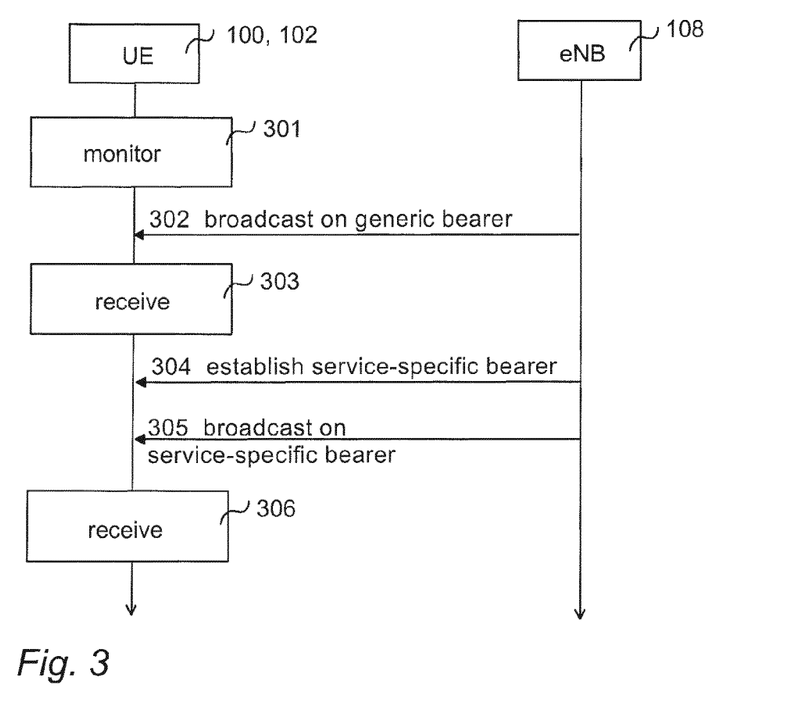
FIG. 3 shows a messaging diagram illustrating an exemplary messaging event according to an embodiment of the invention.

FIG. 2 is a block diagram of an apparatus according to an embodiment of the invention. FIG. 3 shows a user equipment 100, 102 located in the area of a radio network node 108. The user equipment or UE 100, 102 comprises a controller 201 operationally connected to a memory 202 and a transceiver 203. The controller 201 controls the operation of the user equipment 100, 102. The memory 202 is configured to store software and data. The transceiver 203 is configured to set up and maintain a wireless connection 104, 106 to the radio network node 108, respectively. The transceiver 203 is operationally connected to a set of antenna ports 204 connected to an antenna arrangement 205. The antenna arrangement 205 may comprise a set of antennas. The number of antennas may be one to four, for example. The number of antennas is not limited to any particular number. The user equipment 100, 102 may also comprise various other components, such as a user interface, camera, and media player. They are not displayed in the figure due to simplicity.

The radio network node 108, such as an LTE (or LTE-A) base station (eNode-B, eNB) comprises a controller 206 operationally connected to a memory 207, and a transceiver 208. The controller 206 controls the operation of the radio network node 108. The memory 207 is configured to store software and data. The transceiver 208 is configured to set up and maintain a wireless connection to the user equipment 100, 102 within the service area of the radio network node 108. The transceiver 208 is operationally connected to an antenna arrangement 209. The antenna arrangement 209 may comprise a set of antennas. The number of antennas may be two to four, for example. The number of antennas is not limited to any particular number. The radio network node 108 may be operationally connected (directly or indirectly) to another network element 110 of the communication system, such as a core network (CN) node, a broadcast multicast service center (BM-SC), a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface 210.

The core network (CN) node 110 comprises a controller 211 operationally connected to a memory 212, and an interface 213. The controller 211 controls the operation of the core network node 110. The memory 212 is configured to store software and data. The interface 213 is configured to connect (directly or indirectly) to the radio network node 108. The core network node 110 may be operationally connected (directly or indirectly) e.g. to the internet 112 (not shown in FIG. 2).

The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 100, 102, 108, 110 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 100, 102, 108, 110 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 202, 207, 213 may include volatile and/or non-volatile memory and typically stores content, data, or the like. For example, the memory 202, 207, 213 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

The signalling chart of FIG. 3 illustrates the required signalling. In the example of FIG. 3, an apparatus 100, 102 which may comprise e.g. at least one network element such as a user terminal UE, may monitor, in item 301, a generic broadcast bearer associated with communication services. In item 302, a network element 108 (which may comprise e.g. a radio network node such as an LTE base station eNB, or a broadcast multicast service center (BM-SC)), may broadcast, to user terminals 100, 102, service data related to the specific communication service, on a generic broadcast bearer. In item 303, in response to receiving an indication of broadcasted service data appearing on the generic broadcast bearer, the user terminal 100, 102 may receive broadcasted service data related to the specific communication service, on the generic broadcast bearer. In item 304, the apparatus 108 may establish a separate service-specific broadcast bearer for the specific communication service. In item 305, the apparatus 108 may broadcast, to the user terminals 100, 102, service data related to the specific communication service on the service-specific broadcast bearer. In item 306, in response to the separate service-specific broadcast bearer being established for the specific communication service, the user terminal 100, 102 may receive the broadcasted service data related to the specific communication service on the service-specific broadcast bearer.

Figure 4:
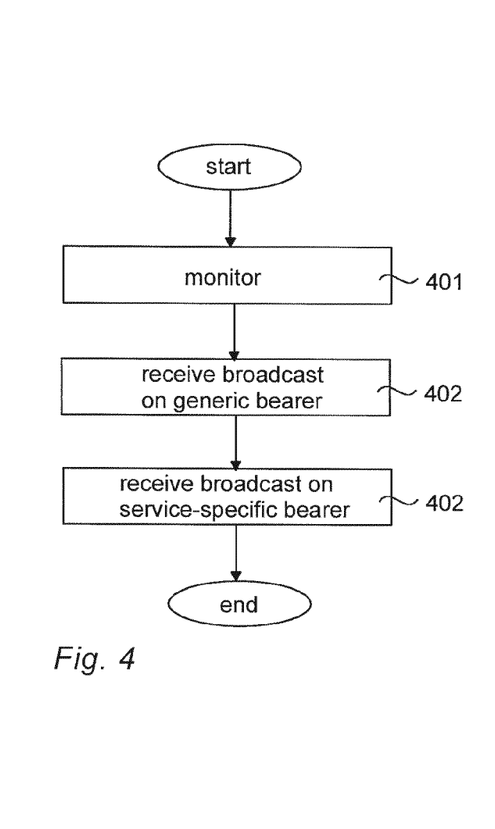
FIG. 4 shows a schematic diagram of a flow chart according to an exemplary embodiment of the invention.

FIG. 4 is a flow chart illustrating an exemplary embodiment. The apparatus 100, 102 which may comprise e.g. at least one network element such as a user terminal UE, may monitor, in item 401, a generic broadcast bearer associated with communication services. In item 402, in response to receiving an indication of broadcasted service data appearing on the generic broadcast bearer, the user terminal 100, 102 may receive broadcasted service data related to the specific communication service, on the generic broadcast bearer. In item 403, in response to a separate service-specific broadcast bearer being established for the specific communication service, the user terminal 100, 102 may receive broadcasted service data related to the specific communication service on the service-specific broadcast bearer.

Figure 5:
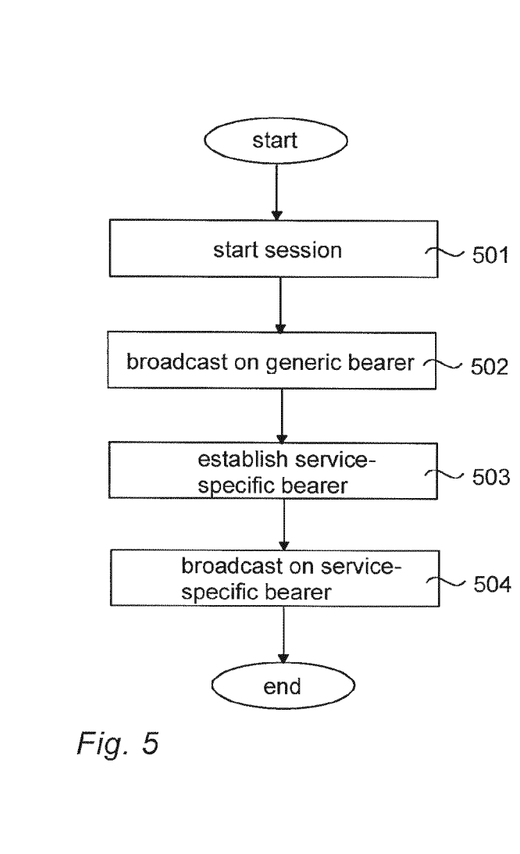
FIG. 5 shows a schematic diagram of a flow chart according to an exemplary embodiment of the invention.

FIG. 5 is a flow chart illustrating an exemplary embodiment. The apparatus 108 (which may comprise e.g. a radio network node such as an LTE base station eNB, or a broadcast multicast service center (BM-SC)), may start, in item 501, a session for a specific communication service (or receive a session start indication). In item 502, the apparatus 108 may broadcast, to user terminals 100, 102, service data related to the specific communication service, on a generic broadcast bearer. In item 503, the apparatus 108 may establish a separate service-specific broadcast bearer for the specific communication service. In item 504, the apparatus 108 may broadcast, to the user terminals 100, 102, service data related to the specific communication service on the service-specific broadcast bearer.

The steps/points, signalling messages and related functions described above in FIGS. 1 to 5 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method comprising monitoring, in a user terminal, for broadcasted service data on a generic broadcast bearer associated with communication services; in response to receiving an indication of broadcasted service data appearing on the generic broadcast bearer, receiving, in the user terminal broadcasted service data, on the generic broadcast bearer.

According to another exemplary embodiment, the method further comprises, in response to a separate service-specific broadcast bearer being established for a specific communication service, receiving, in the user terminal, broadcasted service data related to the specific communication service on the service-specific broadcast bearer.

According to yet another exemplary embodiment, there is provided a method comprising broadcasting, from the network apparatus to user terminals, service data related to a specific communication service, on a generic broadcast bearer.

According to yet another exemplary embodiment, the method further comprises establishing, in the network apparatus, a separate service-specific broadcast bearer for the specific communication service; broadcasting, from the network apparatus to the user terminals, service data related to the specific communication service on the service-specific broadcast bearer.

According to yet another exemplary embodiment, the method comprises associating an identifier of the generic broadcast bearer with the communication service as part of pre-configuration information.

According to yet another exemplary embodiment, the identifier of the generic broadcast bearer comprises a temporary mobile group identity TMGI and/or a logical channel identifier LCID.

According to yet another exemplary embodiment, the method comprises using a pre-established generic broadcast bearer for fast service initiation.

According to yet another exemplary embodiment, an identity of the service is signalled in-band as part of scheduled data.

According to yet another exemplary embodiment, user terminals authorized to receive service content are provided with a cryptographic key for deciphering the service content.

According to yet another exemplary embodiment, a service-specific broadcast bearer is identified with an identifier, wherein the identifier of the service-specific broadcast bearer comprises a temporary mobile group identity TMGI and/or a logical channel identifier LCID different from the identifier of the generic broadcast bearer.

According to yet another exemplary embodiment, a single generic pre-established bearer is provided per MCH channel involving a certain set of cells, a certain set of reserved sub-frames and a certain modulation and coding used for transmission.

According to yet another exemplary embodiment, the method comprises using an MCH channel for broadcasting of group communication.

According to yet another exemplary embodiment, the method comprises using a cell-specific broadcasting mode, wherein the user terminal monitors at least one broadcast RNTI for transmissions.

According to yet another exemplary embodiment, there is provided an apparatus comprising at least one processor; and at least one memory including a computer program code, wherein the at least one memory and the computer program code are configured to, with the at least one processor, cause the apparatus to perform any of the method steps.

According to yet another exemplary embodiment, there is provided a computer program product comprising program instructions which, when run on a computing apparatus, causes the computing apparatus to perform any of the method steps.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS eNB evolved node-B (LTE base station)
EPS evolved packet system
LCID logical channel ID
LTE long term evolution
LTE-A long term evolution advanced
MAC medium access control
MBMS multicast broadcast multimedia service
MBSFN multicast broadcast single frequency network
MCCH MBMS control channel
MCH multicast channel
RRC radio resource control
TMGI temporary mobile group identity
UE user equipment
UMTS universal mobile telecommunications system
UTRAN UMTS terrestrial radio access network
ID identifier
RNTI radio network temporary identifier
TETRA terrestrial trunked radio

The invention claimed is:
1. A method for group communication in a communications system, the method comprising:
monitoring, in a user terminal, for broadcasted service data on a generic broadcast bearer associated with communication services, wherein the generic broadcast bearer is a pre-established broadcast bearer not dedicated to any specific service;
in response to receiving an indication of broadcasted service data for a specific communication service appearing on the generic broadcast bearer, receiving, in the user terminal, broadcasted service data for the specific communication service, on the generic broadcast bearer; and in response to a separate service-specific broadcast bearer being established for the specific communication service, receiving, in the user terminal, broadcasted service data related to the specific communication service on the service-specific broadcast bearer;

wherein a single generic pre-established bearer is provided per multicast channel involving a certain set of cells, a certain set of reserved sub-frames and a certain modulation and coding used for transmission.

2. The method of claim 1, further comprising: associating an identifier of the generic broadcast bearer with the communication service as part of pre-configuration information.

3. The method of claim 1, wherein the identifier of the generic broadcast bearer comprises a temporary mobile group identity (TMBG) and/or a logical channel identifier (LCID).

4. The method of claim 1, wherein the method comprises using a pre-established generic broadcast bearer for fast service initiation.

5. The method of claim 1, wherein an identity of the service is signaled in-band as part of scheduled data.

6. The method of claim 1, wherein user terminals authorized to receive service content are provided with a cryptographic key for deciphering the service content.

7. The method of claim 1, wherein a service-specific broadcast bearer is identified with an identifier, wherein the identifier of the service-specific broadcast bearer comprises a temporary mobile group identity (TMGI) and/or a logical channel identifier (LCID) different from the identifier of the generic broadcast bearer.

8. The method of claim 1, wherein the method comprises using at least one of the multicast channels for broadcasting of group communication.

9. The method of claim 1, further comprising: using a cell-specific broadcasting mode, wherein the user terminal monitors at least one broadcast radio network temporary identifier for transmissions.

10. An apparatus comprising at least one processor; and at least one memory including a computer program code, wherein the at least one memory and the computer program code are configured to, with the at least one processor, cause the apparatus to perform the method of claim 1.

11. A computer program product embodied on a non-transitory computer-readable medium comprising program instructions which, when run on a computing apparatus, causes the computing apparatus to perform a method claim 1.

12. A method for group communication in a communications system, the method comprising:

broadcasting, from the network apparatus to user terminals, service data related to a specific communication service, on a generic broadcast bearer, wherein the generic broadcast bearer is a pre-established broadcast bearer not dedicated to any specific service;

establishing, in the network apparatus, a separate service-specific broadcast bearer for the specific communication service; and broadcasting, from the network apparatus to the user terminals, service data related to the specific communication service on the service-specific broadcast bearer;

wherein a single generic pre-established bearer is provided per multicast channel involving a certain set of cells, a certain set of reserved sub-frames and a certain modulation and coding used for transmission.

* * * * *